April 23, 1963 — P. C. JANSON — 3,087,097
AUXILIARY COVER FOR METER SOCKET
Filed March 23, 1960 — 2 Sheets-Sheet 1

INVENTOR.
Paul C. Janson
BY
Frease, Bishop, Johns & Schick
ATTORNEYS

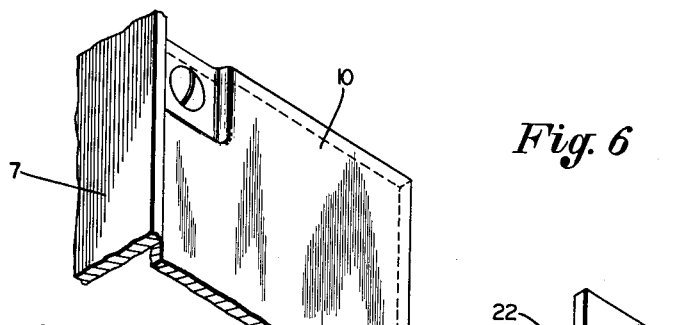
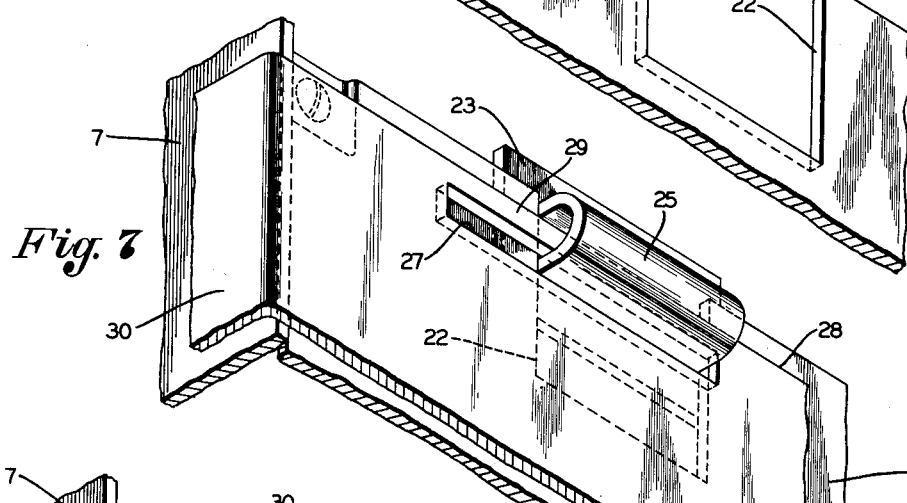
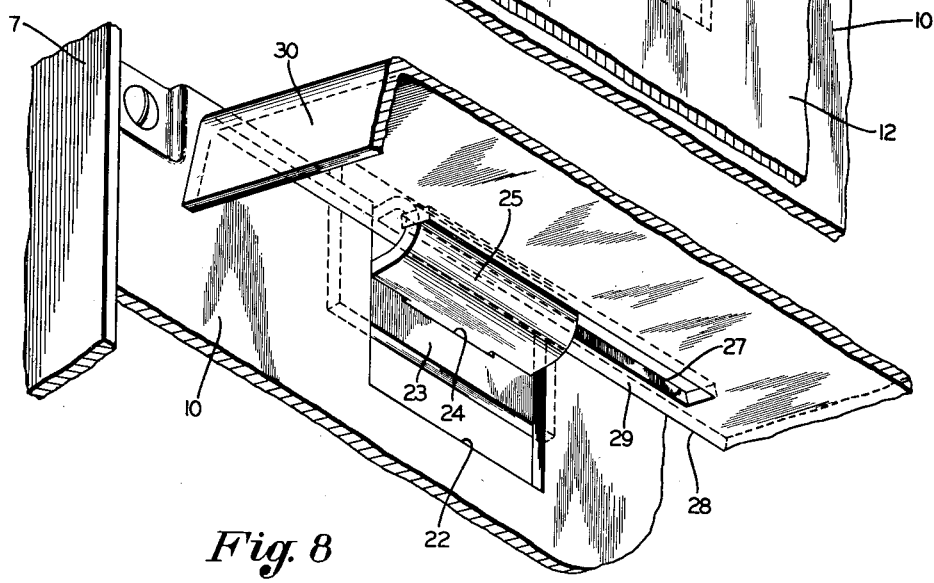

United States Patent Office 3,087,097
Patented Apr. 23, 1963

3,087,097
AUXILIARY COVER FOR METER SOCKET
Paul C. Janson, Canton, Ohio, assignor, by mesne assignments, to The Union Metal Manufacturing Company, Canton, Ohio, a corporation of Ohio
Filed Mar. 23, 1960, Ser. No. 17,011
5 Claims. (Cl. 317—109)

The invention relates to meter sockets for watt-hour meters and the like, and more particularly to a meter socket having an extension or auxiliary portion for housing switches, fuses and the like, and provided with a hinged auxiliary cover.

It is a primary object of the invention to provide such a device in which the extension or auxiliary portion of the meter socket has an inside panel provided with an opening through which access may be had to fuses and switches therein, a hinged cover normally covering said inside panel.

Another object of the invention is to provide such a device in which the auxiliary cover is hinged at its upper end and provided with means for holding the cover latched in raised or open position.

A further object of the invention is to provide a device of the character referred to in which the cover is provided with a hinge so constructed that when the cover is in raised or open position it may be shifted laterally to lock it in open position.

It is also an object of the invention to provide such a hinged cover in which the hinges are in the form of U-shaped straps connected to hinge plates, the cover having elongated slots of greater length than the hinges, through which the U-shaped hinge members are located.

The above objects together with others which will be apparent from the drawings and following description, or which may be later referred to, may be attained by constructing the improved auxiliary cover in the manner hereinafter described in detail and illustrated in the accompanying drawings.

The invention may be described in general terms as comprising an elongated box having a meter socket at its upper portion for receiving a watt-hour meter or the like, with an extension or auxiliary portion therebeneath for housing switches, fuses and the like.

This extension or auxiliary portion of the box has an inside panel at its front side, provided with an opening through which access may be had to the fuses and switches therein. An auxiliary cover is hinged at its upper edge to the upper edge portion of this inside panel and adapted to normally cover the same, latch means being provided for attaching the lower edge of the auxiliary cover to the lower portion of the inside panel when the cover is in closed position.

The hinge members for the auxiliary cover comprise U-shaped straps of sheet metal or the like having reduced end portions located through slots in a hinge plate, and bent outwardly against the inner side of the hinge plate.

The inside panel of the extension or auxiliary portion of the box has slots in its upper edge portion which receive the U-shaped hinge members, the hinge plates being located against the inner side of the inside panel.

The auxiliary cover has laterally disposed slots near its upper edge portion, forming elongated narrow hinge pintles at the upper edge of the cover which are received within the U-shaped hinge members. These slots are of greater length than the U-shaped hinge members so that the cover may be shifted laterally when in open or raised position, and the cover is provided at its side edges with angular flanges for contact with the inside panel when the cover is in open and shifted position to lock the cover in open position.

Having thus briefly described the invention, reference is now made to the accompanying drawings showing an embodiment of the invention, in which:

FIG. 6 is an enlarged, fragmentary perspective view of a portion of the extension or auxiliary portion of the box, showing a portion of the upper end of the inside panel with slot therein to receive one of the hinge members;

FIG. 7 is an enlarged, fragmentary, detail perspective view showing the auxiliary cover in closed position; and FIG. 8 is a similar view showing the auxiliary cover latched in open position.

Figure 1:
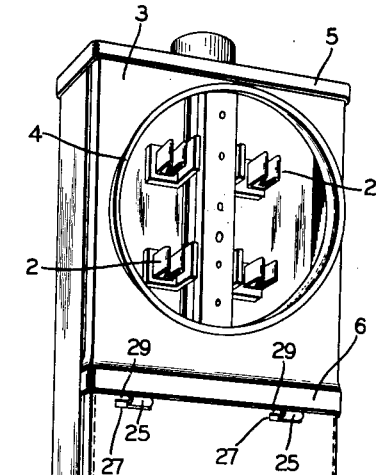
FIG. 1 is a perspective view of a meter socket with extension or auxiliary portion, showing the auxiliary cover in closed position.
Figure 4:
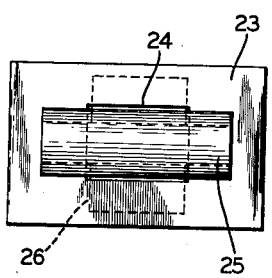
FIG. 4 is a top plan view of the hinge member and hinge plate.

Referring now more particularly to the embodiment of the invention illustrated in the drawings, in which similar numerals refer to similar parts throughout, an elongated sheet metal box is indicated generally at 1. A meter socket is provided in the upper portion of the box and includes the conventional jaws 2 for receiving the usual plates or posts upon the rear of a watt-hour meter or the like.

A removable cover 3 for the upper portion of the box has a meter socket 4 thereon. As in usual practice, the upper end of the meter socket cover 3 may be slidably received beneath the depending flange 5 at the top of the box and the lower edge of the cover 3 may have the outwardly offset terminal flange 6 thereon.

The side walls 7 of the box 1 extend downwardly a considerable distance below the meter socket and, together with the back wall 8 and bottom wall 9, form an extension or auxiliary portion for housing fuses, switches and the like used in connection with the socket meter mounted in the meter socket at the upper end of the box.

An inside panel 10 forms the front of this auxiliary portion or extension of the box and is provided with an enlarged opening 11, through which access may be had to the fuses and switches therein.

In order to prevent unauthorized access to the fuses and switches within the auxiliary portion of the box, an auxiliary cover 12 is provided therefor. This cover is hinged at its upper edge to the inside panel 10 and the lower edge portion thereof is adapted to be normally latched in closed position.

For this purpose, a headed stud 13 is located at the lower end portion of the inside panel 10, and adapted to be received through an aperture 14 in the lower portion of the cover 12. A pair of latch members 15 and 16 are pivotally mounted upon the outside of the cover 12 as at 17.

The latch member 15 has a slot 18 therein adapted to engage the stud 13, behind the head thereof, and the latch member 16 has an offset lower portion 19 adapted to engage over the head of the stud 13. Each of the latch members 15 and 16 has an outturned ear 20 at its lower end adapted to be positioned one above the other when the latch is in closed position, these ears having apertures 21 therein through which the wire of a conventional seal may be located to lock the latch members together, thus locking the cover in closed position.

Figure 5:
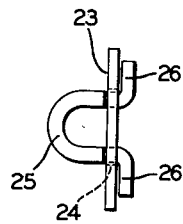
FIG. 5 is an end view of the hinge member and hinge plate.

The upper edge portion of the inside panel 10 is provided, near each side, with a slot 22, as best shown in FIG. 6, for the purpose of receiving the hinges for the auxiliary cover 12. Each of these hinges comprises a hinge plate 23, having spaced slots 24 therein, and the U-shaped hinge member 25 formed of a metal strap having the reduced legs 26 which are located through the slots 24 in the hinge plate and oppositely bent thereneath, as shown in FIG. 5.

The auxiliary cover 12 has a spaced pair of slots 27 near its upper edge, these slots being of greater length than the U-shaped hinge members 25. The slots are located near the upper edge 28 of the cover 12 so as to form narrow hinge pintle portions 29 between each slot 27 and the upper edge 28 of the cover 12, as best shown in FIG. 7.

Angular marginal flanges 30 and 31 are formed at the side edges and bottom edge respectively of the cover 12. The narrow portions 29 are received within the U-shaped hinge members 25, as best shown in FIG. 7, so as to hingedly connect the upper edge of the cover 12 to the upper end of the inside panel 10.

With the cover in closed position, as best shown in FIG. 1, the upper edge of the cover is received beneath the overhanging terminal flange 6 on the lower edge of the meter socket cover 3, so as to provide means for deflecting moisture outwardly from the meter socket cover 3 to the exterior of the auxiliary cover 12.

Also, in the closed position of the cover 12, the side flanges 30 and bottom flange 31 thereof are engaged over the side walls 7 and bottom wall 9 respectively of the box. In the closed position, the head of the stud 13, at the lower end of the inside panel 10, is received through the aperture 14 in the lower end of the cover 12, as shown in FIG. 1, so that the latch members 15 and 16 may be engaged therewith for locking the auxiliary cover upon the box.

When access to the switches, fuses and the like, in the lower extension or auxiliary portion of the box 1 is desired, the conventional seal wire located through the apertures 21 of the latch members 15 and 16 is broken and the latch members moved to the unlatched position, as shown in FIG. 1.

Figure 2:
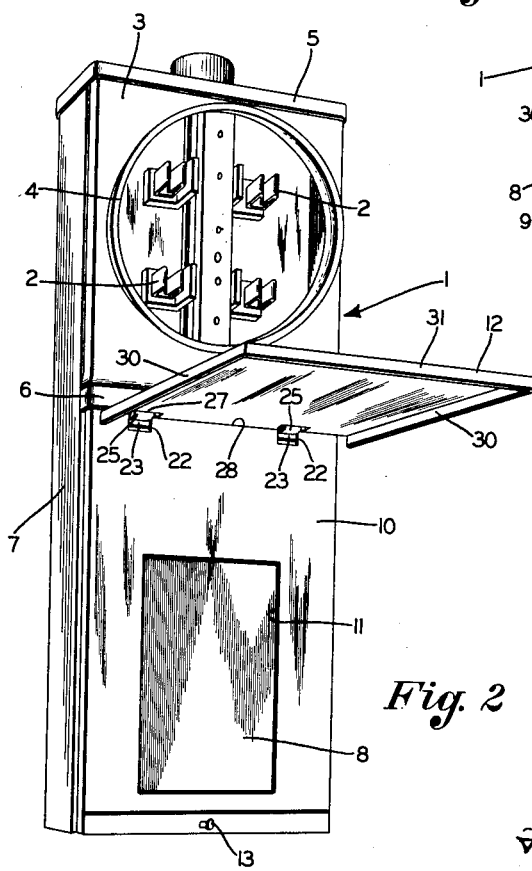
FIG. 2 is a similar view, showing the auxiliary cover latched in the open position.
Figure 3:
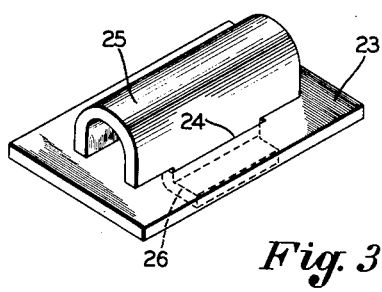
FIG. 3 is an enlarged, detached perspective view of one of the U-shaped hinge members and hinge plates.

The auxiliary cover 12 may then be swung upwardly upon the hinges 25, and in order to latch it in open position, as best shown in FIGS. 2 and 8, the cover is shifted slightly to the right, the elongated slots 27 permitting this shifting movement so that the upper end of the flange 30, at the left side edge of the cover, will contact the inside panel 10, holding the cover latched in open position.

Thus a person wishing access to the fuses and switches, in the auxiliary extension of the box, has both hands free for operating the switches or replacing the fuses as may be desired. It should be understood of course that the watt-hour meter, or other socket meter, mounted in the meter socket 4 holds the meter socket cover 3 in closed position so that opening of the auxiliary cover 12 does not permit access to the meter socket but only to the fuses and switches in the lower extension or auxiliary portion of the box, through the opening 11 in the inside panel 10.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A device of the character described comprising an elongated box formed of a back wall, side walls and top and bottom walls, a meter socket in the upper portion of the box including a meter socket cover at the front of the box and extending from the top of the box to a point spaced from the bottom thereof, an inside panel forming the front wall of the remainder of the box and extending from the lower edge of said meter socket cover to the lower end of the box, there being an opening in said inside panel providing access to the interior of the box below said meter socket, an auxiliary cover for said inside panel, U-shaped hinge members at the upper end of the inside panel, there being elongated slots of greater length than said hinge members in the upper end portion of the auxiliary cover said hinge members being located through said slots for hingedly connecting the auxiliary cover to the inside panel so that the auxiliary cover may be swung upwardly to uncover the opening in the inside panel, whereby the auxiliary cover may be shifted laterally relative to the hinge members, and a flange on one side edge of the auxiliary cover for contact with the inside panel for locking the auxiliary cover in open position.

2. A device of the character described comprising a box, a panel on the front of the box and having an opening therein, a cover for said panel, an angular flange at one side edge of the cover, U-shaped hinge members at the upper end of said panel, there being elongated slots of greater length than said hinge members in the upper end portion of the cover, said hinge members being located through said slots for hingedly connecting the cover to the panel so that the cover may be swung upwardly to uncover the opening in the panel, whereby the cover may be shifted laterally relative to the hinge members and said flange may contact the panel for locking the cover in open position.

3. A device of the character described comprising a box, a panel on the front of the box and having an opening therein, a cover for said panel, an angular flange at one side edge of the cover, and means for shifting the cover laterally relative to the panel when the cover is in open position, whereby said angular flange on the cover will contact with the panel for locking the cover in open position.

4. A device of the character described comprising a box, a panel on the front of the box and having an opening therein, a cover for said panel, an angular flange at one side edge of the cover, hinge members at the upper end of said panel, there being elongated slots of greater length than said hinge members in the upper end portion of the cover, said hinge members being located through said slots for hingedly connecting the cover to the panel so that the cover be swung upwardly to uncover the opening in the panel, whereby the cover may be shifted laterally relative to the hinge members and said flange may contact the panel for locking the cover in open position.

5. A device of the character described comprising an elongated box formed of a back wall, side walls and top and bottom walls, a meter socket in the upper portion of the box including a meter socket cover at the front of the box and extending from the top of the box to a point spaced from the bottom thereof, an inside panel forming the front wall of the remainder of the box and extending from the lower edge of said meter socket cover to the lower end of the box, there being an opening in said inside panel providing access to the interior of the box below said meter socket, an auxiliary cover for said inside panel, hinge members at the upper end of the inside panel, there being elongated slots of greater length than said hinge members in the upper end portion of the auxiliary cover, said hinge members being located through said slots for hingedly connecting the auxiliary cover to the inside panel so that the auxiliary cover may be swung upwardly to uncover the opening in the inside panel, whereby the auxiliary cover may be shifted laterally relative to the hinge members, and a flange on one side edge of the auxiliary cover for contact with the inside panel for locking the auxiliary cover in open position.

References Cited in the file of this patent
UNITED STATES PATENTS

| | | |
|---|---|---|
| 259,390 | Hensley | June 13, 1882 |
| 1,306,191 | Platt | June 10, 1919 |
| 2,156,672 | Allen | May 2, 1939 |
| 2,173,062 | Hammerly | Sept. 12, 1939 |
| 2,182,603 | Walker | Dec. 5, 1939 |